No. 867,587. PATENTED OCT. 8, 1907.
E. J. MOORE.
COMBINATION VALVE AND METER.
APPLICATION FILED JAN. 22, 1907.
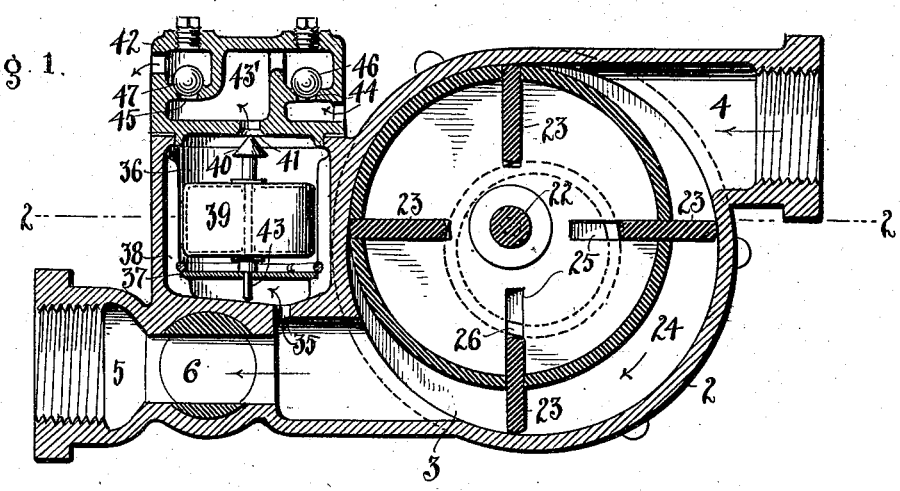
INVENTOR
Edward J. Moore
By Fisher & Mosert Attys

UNITED STATES PATENT OFFICE.

EDWARD J. MOORE, OF CLEVELAND, OHIO.

COMBINATION VALVE AND METER.

No. 867,587.　　　　Specification of Letters Patent.　　　　Patented Oct. 8, 1907.

Application filed January 22, 1907. Serial No. 353,541.

*To all whom it may concern:*

Be it known that I, EDWARD J. MOORE, a citizen of the United States, residing at Cleveland, in the county of Cuyahoga and State of Ohio, have invented certain new and useful Improvements in a Combination Valve and Meter; and I do declare that the following is a full, clear, and exact description of the invention, which will enable others skilled in the art to which it appertains to make and use the same.

My invention relates to a combination valve and meter, and the invention consists in a meter and valve arrangement adapted to be used in connection with liquid supply systems having drainage facilities, all as hereinafter shown and described and more particularly pointed out in the claims.

One object of the invention is to provide a meter adapted to be set for a predetermined movement and which will combine with valve mechanism to automatically shut off the supply of liquid when a predetermined amount has passed through the meter.

Another object is embodied in the air intake and exhaust valve arrangement whereby the device and the pipe line connected therewith is adapted to be perfectly drained of its contents whenever this may be desired and also whereby complete preliminary filling of the device and line may be obtained by exhausting the air when filling.

In the accompanying drawings, Figure 1 is a central sectional view of my invention, and Fig. 2 is a sectional view on line 2, 2, Fig. 1. Fig. 3 is a side elevation of the device with the main valve parts sectioned away to disclose the inner construction. Fig. 4 is a detailed view of the main valve handle and a portion of the casing, and showing the locking member for the handle.

The invention comprises a casing —2— having a cylindrical meter chamber —3— with an inlet passage and connection —4— at one side and top, and an outlet passage and connection —5— at the opposite side and bottom.

A tapered plug valve —6— is seated within outlet passage and connection —5— to control the flow of liquid from the device and a handle —7— is rotatably mounted upon an outer extension —8— of valve —6— to operate the same. Thus, handle —7— has a small spring pressed lever —9— pivotally mounted upon its outer face and which is connected to a locking pin —10— passing through an opening in the handle to its inner side where engagement may be effected with either of two openings or notches —11— in the face of fixed valve casing cap —12—, according to whether valve —6— is to stand in either one or the other of its two positions, that is opened or closed.

A catch and trip member —14— pivotally mounted upon the inside face of handle —7— is adapted to make interlocking engagement with a ratchet tooth —15— on plug extension —8— and a coiled spring —16— encircling said extension within the recessed end of the plug valve seat of casing —2— is fixed to valve —6— at one end and to cap —12— at its other end, thereby providing a spring pull or tension for valve —6— adapted to maintain locking engagement between catch member —14— and ratchet tooth —15— until said member is tripped at its free end —17— and the parts are disengaged, when said spring is further adapted to return valve —6— from an open position to a closed position, and as limited by stop pin —18— on the valve plug as it travels from shoulder to shoulder —19—, see Fig. 3.

A compressible spring —20— bears against the end of valve —6— and fixed cap —12— to hold said valve to its seat.

The meter portion of the device consists of a rotatable drum —21— of less diameter than circular chamber —3— and the same is mounted on a shaft —22— having bearings in the side walls of casing —2— and off to one side or eccentric to the center of said chamber, thereby providing a communicating liquid passage —24— between passages —4— and —5—, respectively.

A series of vanes or blades —23— are slidably supported in radial slots —25— of drum —21— and are held to a given orbit of travel by annular flanges —26— on the side walls of casing —2— and which flanges are concentric with circular chamber —3—, thus perpetually interposing one or more of vanes or blades —23— in the path of the liquid as it flows through communicating passage —24— and closing all exit therefrom except as the liquid itself causes rotation of drum —21— by the pressure upon the exposed vanes or blades projecting into said passage. One end of shaft —22— projects beyond its bearing into a gear chamber —27— also embodied within casing —2— and which is closed at one side by a dial plate —28— screwed to the casing.

The end of shaft —22— is provided with gear teeth —29—, and a train of gears and pinions —30— mounted on pintles or shafts —31— supported by casing —2— and dial plate —28— transmit rotary movement between drum —21— and a rotary dial hand —32— at differentiating speeds.

Radial graduations —33— marked from zero upward on the face of dial plate 28 adapt dial hand —32— to be set at any point within a radius of 360 degrees and whereby a relative movement of drum —21— in discharging a given amount of liquid may be anticipated and predetermined. The free end of dial hand 32 is adapted to engage end —17— of catch and trip member —14— to release valve —6— so that it may close under spring pressure and shut off the flow of liquid after the requisite amount of liquid is withdrawn and as determined by dial hand —32— reaching the zero point.

Now referring to the air intake and exhaust valve mechanism forming part of this device, it will be noted that the same is in open communication with discharge passage —5— at an intermediate point between valve —6— and meter drum —21— and as indicated by opening —35— which communicates with float chamber —36— in casing —2—. A false bottom —37— in said chamber —36— rests on shouldered ribs —38— which also serve as guides for float body —39— having a cone shaped valve head —40— adapted to seat within and thereby close air passage —41— in the bottom wall of cover —42—. A central downwardly extending pin —43— rigid with float body —39— also acts as a guide therefor because of its slidable relation with a central opening in false bottom —37—. Cover —42— has a central air chamber —43'— with which air passage —41— connects and communication with the outer atmosphere is had therefrom through separate intake and exhaust openings —44— and —45— as controlled by ball check valves —46— and —47—, respectively.

The advantage of the foregoing arrangement is better understood when the operation of the whole device is considered in connection with a system for delivering liquids from a given source of supply and under pressure, such as air pressure upon the liquid in the line of connections. Thus, upon initial filling of the pipes and to provide for the complete filling of the device so that the meter will correctly measure the flow at the beginning, it is essential that all the air be forced out of the line and the device or devices on the line and the meter filled with the liquid up to valve —6—. As the liquid in the line advances under its head of pressure, the trapped air within the line is forced through the device, drum —21— being rotated thereby and the air escaping through opening —35— and 45, ball valve —47— unseating to this end. When the head of the liquid reaches float chamber 36, float body 39 is raised thereby and its valve —40— closes opening 41 and the same remains closed thereafter as long as pressure is upon the line. The device is now ready for the withdrawal of liquid and to obtain a predetermined supply thereof, dial hand —32— is set at any given point and valve —6— is opened. The flow of the liquid through the meter returns hand dial —32— to the zero point, engages trip member —14— and valve —6— closes automatically. This operation may be repeated indefinitely, and when the plant is shut down for any reason the liquid is withdrawn entirely from the line but the flow is reversed for this operation by relieving the pressure upon the line and draining back into the storage receptacle from which it was originally forced. In this drainage operation, the column of liquid within the line exerts a pull upon drum —21— and reverses the usual order of its rotation and this must occur because of the vacuum formed within the pipe upon the withdrawal of the liquid and which is not offset until all the liquid within the meter and float valve chamber —36— is also withdrawn and air admitted to the line through openings 44, 41 and 35 and through the meter. Practically no liquid is thus left in the valve connections or line to endanger the plant in the event of fire, and the ball check valves effectively seal all air inlets and outlets to the line at this time so that no vapors may escape nor any clinging liquids may gum or harden within the device and impede its operation upon starting.

The amount of liquid withdrawn at each operation of the meter may be definitely recorded by a secondary hand —49— which is frictionally mounted on fixed hub —50— of plate —28—. Said hand —49— is adapted to be set at any starting point in line with dial hand —32— and remains at the place set during the return movement of the dial hand to zero.

Now referring again to shaft —22—, it will be observed that leakage from fluid chamber —3— into gear chamber —27— at the projecting or gear end of said shaft is prevented by the reduced and tapered portion —51— which is adapted to seat in a correspondingly shaped bearing recess in the casing wall and which is held to its seat by a spring pressed pin —52— socketed in the opposite end of the shaft and bearing against the opposite wall of the casing.

What I claim is:

1. A meter and a liquid controlling valve therefor, in combination with an air valve arranged between said meter and valve and constructed to automatically open and close upon the operation of the meter.

2. The combination of a meter and valve therefor, said meter provided with air openings and a main air controlling valve therefor, said meter and supplemental check valves to close the air openings to said meter when the main valve and said meter are inactive.

3. A combination meter and valve device provided with an air intake and exhaust opening intermediate of the valve and meter parts, and a float controlled valve for said opening.

4. A meter having a main rotatable member and a dial hand and operating connections therefor, combined with a valve for said meter having self closing means and a handle having a trip engaging member for said valve adapted to project in the path of the dial hand, and means to lock said handle in set positions.

5. A combined liquid meter and valve device having valved air intake and exhaust openings adapted to control filling and emptying of the device, said meter comprising a rotatable member having a dial connections, and said valve adapted to control the flow of liquid through the device and having a handle and locking means therefor to set the valve, means operatively engaged by said dial connections to unlock the handle, and means to close the valve automatically upon such release.

6. A liquid meter comprising a cylindrical casing having inlet and outlet passages, a rotatable liquid driven member within the casing, a shaft for said member having a reduced and tapered portion seated within the casing and projecting through the same, and said shaft having spring pressed means adapted to hold said shaft seated, in combination with a recording dial, and a dial hand having gear connections with said shaft.

7. A meter and a valve therefor, in combination with controlling mechanism between said valve and meter adapted to automatically shut off the flow of liquid through said meter upon withdrawal of predetermined amounts, and an air valve located between said meter and valve and constructed to automatically open and close upon the operation of the meter.

8. A meter and a valve therefor and an air valve arranged between said meter and valve and constructed to automatically open and close upon the operation of the meter, in combination with mechanism adapted to set said meter for the withdrawal of predetermined amounts of liquid and means operated thereby to close said valve when the predetermined amount is withdrawn.

In testimony whereof I sign this specification in the presence of two witnesses.

EDWARD J. MOORE.

Witnesses:
E. M. FISHER,
F. C. MUSSUN.